Figure 1:
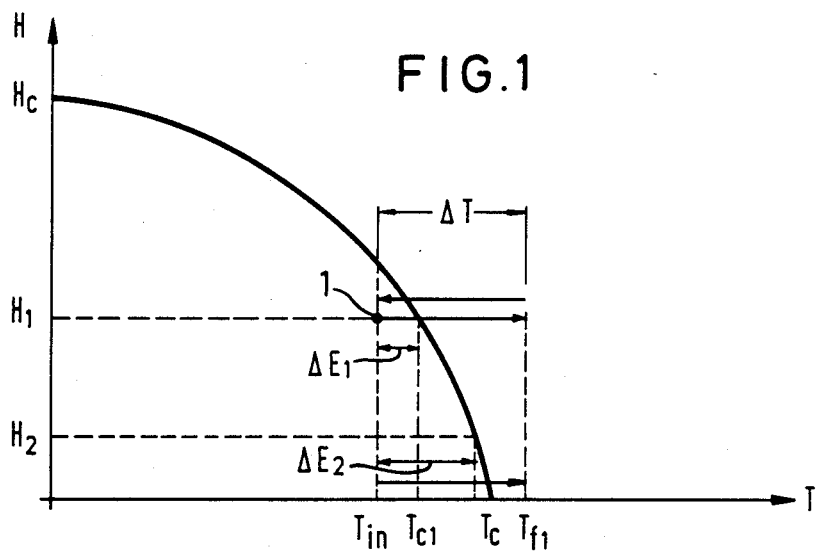

United States Patent [19]

Drukier et al.

[11] Patent Number: 4,968,475

[45] Date of Patent: Nov. 6, 1990

[54] METHOD AND APPARATUS FOR THE DETECTION OF NEUTRINOS AND USE OF NEUTRINO DETECTOR

[76] Inventors: Andrzey K. Drukier, 22 Glaenøgade, Københaun, Denmark; Leo Stodolsky, Nikolaiplatz 6, Munich, Fed. Rep. of Germany

[21] Appl. No.: 821,862

[22] Filed: Jan. 21, 1986

Related U.S. Application Data

[63] Continuation of Ser. No. 427,100, Sep. 29, 1982, abandoned.

[30] Foreign Application Priority Data

Aug. 9, 1982 [EP] European Pat. Off. .......... 82107203

[51] Int. Cl.$^5$ ............................................. G21C 17/00
[52] U.S. Cl. ..................................... 376/153; 376/913
[58] Field of Search ............................... 376/153, 913

[56] References Cited

U.S. PATENT DOCUMENTS

| | | | |
|---|---|---|---|
| 3,691,381 | 9/1972 | Kleppner | 250/83.3 R |
| 4,135,091 | 1/1979 | Lanza et al. | 250/336 |
| 4,149,075 | 4/1979 | Drukier et al. | 250/336 |
| 4,205,268 | 5/1980 | Eerkens | 376/153 |
| 4,576,777 | 3/1986 | Weber | 376/153 |

OTHER PUBLICATIONS

Inst. Phys. Conf. Ser. No. 42, (1978) Chpt. 3 "Theoretical Aspects of Interactions at Low Energies", Fritzch
Phys. Rev. C, vol. 22, No. 2, Avignone et al. (1980) pp. 594, 597, 598.
Neutrino Phys. & Astropohys., Fiorini, pp. 241-243.
"Proc. of vol. 2 of Neutrino 75", IVPAP Conf., Hungary 6/17/75 p. 444.
PARPA Report 83NP032, Weber (2183) (pp. 16-18).
Astron & Astrophys., 46, 253-255 (1976) Opher, Coherent scattering of Neutrinos from a Shock Wave.
Astron. & Astrophys., 37, 135-137 (1974) Opher, Coherent Scattering of Cosmic Neutrinos.
Phys. Rev. D., vol. 27, No. 6 (3/15/83) pp. 1228-1242. Langacker et al., On the detection of Neutrinos by Coherent Scattering.
Physics Today (8/83) pp. 20-22.
"Superheated superconducting Colloid As Total Absorption Detector-Preliminary Calculations," A. K. Drukier, Nuclear Instruments and Methods 154 (1978), pp. 83-89.
"On The Possible Application of Superheated, Superconducting Colloid As A Synchrotron Radiation Detector," A. K. Drukier, Nuclear Instruments & Methods 201 (1982, pp. 77-84.
"Magnetic Field Dependence Of Superheated Superconducting Detectors," D. Hueber, C. Valette, and G. Waysand, Nuclear Instruments and Methods 167 (1979) pp. 201-204.

*Primary Examiner*—Salvatore Cangialosi
*Attorney, Agent, or Firm*—Townsend and Townsend

[57] ABSTRACT

Neutrinos are detected by allowing them to scatter on nuclei contained in a detector and by detecting the recoil of the nuclei. Because the probability of a neutrino being scattered is very low the probability is very high that a neutrino will only cause recoil of a single nucleus. On the other hand background radiation is likely to cause the recoil of a large number of electrons and/or nuclei so that neutrino scattering can be detected by distinguishing between the recoil of a single nucleus and the simultaneous recoil of a plurality of electrons/nuclei. In one form of the detector the nuclei are present as minute superconducting metal grains which are held in the superconducting state. At low temperatures the grains have a very low specific heat and the scattering of a neutrino will cause a single grain to heat up and change from the superconducting to the normal conducting state. This change will result in a perturbation of an applied magnetic field, as a result of the Meissner effect, and the perturbation of the magnetic field can be detected, for example as an e.m.f. induced in a detector loop. Several different superconducting arrangements are described. A semiconductor arrangement for detecting nuclear recoil is also described. The neutrino detector can be used, among other things, for monitoring reactor activity and for prospecting for subterranean deposits of radioactive elements, minerals found in association with these elements, and oil and gas.

35 Claims, 7 Drawing Sheets

METHOD AND APPARATUS FOR THE DETECTION OF NEUTRINOS AND USE OF NEUTRINO DETECTOR

This is a continuation of application Ser. No. 427,100, filed Sept. 29, 1982, now abandoned.

The present invention relates to method and apparatus for the detection of neutrinos and to uses of neutrino detectors and has particular reference to the detection of low and medium energy neutrinos.

The existence of neutrinos and the role they play in nuclear reactions have been known for many years. Neutrinos themselves occur in several different forms namely the so-called electronic, muonic and tauonic neutrinos. Only electronic and muonic neutrinos have been definitively detected to date. Each type of neutrino also has an antiparticle called the antineutrino. Neutrinos are recognised as having no electrical charge and essentially zero mass. These properties account for the very weak interactions of neutrinos with matter and the extreme difficulties which have been encountered in trying to detect them. By way of example of the neutrinos emitted by the sun, less than one out of a billion will be stopped while passing through the entire earth.

Prior art detection techniques have been based on the so-called charged current reactions such as the reaction:

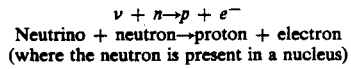
Neutrino + neutron→proton + electron
(where the neutron is present in a nucleus)

In one known detector the neutrons are available as a mass of several hundred tons of a chlorine compound. Neutrinos can be absorbed by the chlorine nuclei to form argon and electrons. The argon is radioactive and can thus be detected. Unfortunately the number of neutrinos detected, frequently referred to as the number of events, is exceedingly low and enormous difficulty is experienced in distinguishing between radioactivity due to the creation of argon and background radioactivity. Such detectors have had to be extremely big and have had to be placed in extremely well shielded enclosures, for example at the bottom of a deep mine shaft, in order to offer any prospect at all of distinguishing a few events per week. Even with very intense sources of neutrinos such as nuclear reactors the detection rate of existing detectors is far too low to be of anything other than purely research interest. All existing detectors have a very poor signal to background noise ratio, at least for low and medium energy neutrinos.

The principal object underlying the present invention is to provide improved methods and apparatus for the detection of low and medium energy neutrinos which enable a much higher detection rate for a lower weight of detector and which enable better discrimination of neutrinos from other types of radiation and noise. Furthermore the invention is directed to new uses of a neutrino detector made possible by the improved detection capability.

In accordance with the present invention there is provided a method of detecting neutrinos comprising the steps of scattering the neutrinos on nuclei contained in a detector and detecting the recoil of said nuclei, e.g. through the resultant heating effect.

The present invention is based on several recognitions. Firstly, that it is Possible to exploit one of the so-called neutral current reactions of neutrinos in which the neutrinos are scattered on a nucleus, with a small transfer of energy to the nucleus, which results in recoil of this nucleus. Secondly, that the rate of such scatterings on medium and heavy weight nuclei is relatively high for neutrino reactions but nevertheless still low in absolute terms, which allows the reaction to be exploited in a detector as will later be made clear.

At first sight the amount of energy transferred to the nucleus is so small that the prospects of detecting it by conventional methods let alone distinguishing it from the much larger effects of any form of background radiation, appear to be unpracticable.

The present invention however recognises that nuclear recoils due to the scattering of neutrinos can be detected by measuring an associated signal representative of perturbation of the quiescent state of the detector.

More specifically the invention contemplates a method as set out above which comprises the further steps of analysing the measured nuclear recoil to discriminate between the recoil of a single nucleus and other types of interactions involving recoil of a plurality of electrons and/or nuclei and accepting the signal as a neutrino count only when a single nucleus has recoiled.

In other words the invention recognises that because the neutrino scattering cross-section is very low the probability of a neutrino scattering on more than one nucleus on its passage through the detector is virtually zero. On the other hand other types of incident radiation will react much more strongly with the detector and will cause quasisimultaneous recoil of a large number of electrons and nuclei at different points through the detector.

As the number of events, i.e. the number of detected neutrinos, is likely to be low in relation to the number of recoils due to background radiation it is desirable to consider the detector as a plurality of volumes and to accept the neutrino count only when a single nucleus in the associated volume has recoiled. In this way the efficiency of the detector can be significantly improved because radiation other than neutrinos entering one of the volumes will give rise to several events within this volume so that it can be readily distinguished from a neutrino. The volumes need not be fixed physical volumes but can be volumes specified by the signal processing arrangement. For example, if a possible event is detected at one point of the detector the electronic circuitry or software can be used to identify a volume around this point of the detector and to check for further activity in this volume.

In a preferred method in accordance with the present invention the nuclei are present in the form of the nuclei of a plurality of superconducting metal elements and the step of detecting the nuclear recoil is effected by detecting the heating and subsequent change of state of one of the superconducting metal elements.

In this method the superconducting metal elements are maintained in the superconducting state by appropriate cooling and in the presence of a suitable magnetic field. At low temperatures the specific heat of the metal element becomes very low and the energy transferred from the neutrino to a nucleus within the metal element is able to increase the temperature of that particular element by an amount sufficient for it to change to the normal non-superconducting state.

In this method the material of the superconducting metal elements, the operating temperature and the applied magnetic field are preferably such that the superconducting elements are not in a superheated state. This means that the elements which change from the superconducting state to the non-superconducting state will subsequently change back to the superconducting state after they have cooled down again. The time required for an individual element to return to the superconducting state is a clear measure of the amount of energy deposited in this element. The present invention exploits this recognition by the further steps of detecting the time required for a superconducting metal element to change back to the superconducting state, by comparing this time with a characteristic time range and by accepting the neutrino count only when the measured time falls within said time range. The invention thus recognises that the energies of incident neutrinos will lie within a specified characteristic range, which is associated with a related time range, and that the time taken by a superconducting element to "flip" out of the superconducting state and to "flop" back into the superconducting state will be a characteristic signature of a neutrino. In fact this signature is sufficiently individual that it provides a good way of at least statistically distinguishing between neutrinos and other forms of radiation.

In a particularly preferred embodiment of the method the superconducting metal elements each have at least one dimension which is very small and are distributed in a plurality of volumes. Furthermore, at least one relatively massive superconducting metal body is present in each volume and the method comprises the further steps of detecting changes of state of said relatively massive superconducting metal bodies as a measure of local temperature instability in the associated volume and rejecting other signals originating from the associated volume during the period of temperature instability.

This embodiment of the method recognises that temperature instabilities can occur in the superconducting detector, which would typically have a very low temperature of the order of less than 2° Kelvin and that these temperature instabilities could be misinterpreted as being due to neutrinos. This is avoided in the present embodiment because a change of temperature in a given volume will result in a change of state of a relatively massive superconducting metal body present in that volume and this change of state can be detected as a measure of the temperature of that volume.

In the above methods the step of detecting the change of state of the superconducting metal elements is preferably effected by subjecting the metal elements to a magnetic field at the appropriate level and electronically detecting the entry of the magnetic field into the superconducting elements on the change of state from superconducting to non-superconducting, and/or expulsion of the magnetic field from the superconducting elements on the change of state from non-superconducting to superconducting.

In other words the invention makes use of the socalled Meissner effect in which a magnetic field is excluded from a superconducting element when in the superconducting state but enters the superconducting element when this changes into the non-superconducting state.

Clearly incident neutrinos can have a wide range of energies. The methods and apparatus presently disclosed are particularly suitable for low and medium energy neutrinos with energies ranging up to 150 MeV.

A neutrino detector with a good energy resolution, i.e. the ability to discriminate between different neutrino energies is highly desirable. Fortunately this desire can be readily satisfied by the presently disclosed methods and apparatus. In accordance with one variant of the present method energy discrimination can be achieved simply by selecting an appropriate level of the magnetic field in which the superconducting elements are situated. The level of this magnetic field determines the amount of energy which needs to be deposed in the superconducting element to cause a change of state. As this energy is statistically related to the energies of the incident neutrinos it defines a minimum energy limit for the neutrinos which are detected. Of course this lower energy limit also applies to background radiation and thus provides a further tool for discriminating against certain types of background radiation. By taking successive measurements at different energy thresholds the energy spectrum can be determined by using a subtraction technique.

The energy resolution can be further improved if account is taken of the time required for a superconducting element to return to the superconducting state following a nuclear recoil. Clearly the amount of energy deposed in the element and thus the rise in temperature thereof is related to the energy of the incident radiation /neutrino. The time required for the element to cool down and reenter the superconducting state is thus a direct measure of the energy deposed and provides information on the energy of the incident neutrino or other radiation.

For the abovementioned techniques to work effectively the superconducting elements must be substantially uniform in size and composition.

The entry/expulsion of the magnetic field into/from the superconducting elements is conveniently sensed in one method by detecting the associated e.m.f. induced into an associated pick-up loop.

Alternatively the entry/expulsion of the magnetic field into/from the superconducting elements is detected by detecting the change of the state of polarisation of a monitoring light beam directed through the detector.

In a yet further alternative embodiment of the method the superconducting metal elements are present in the form of thin wires or films and the step of detecting the change of state is effected by monitoring the change of resistivity and/or impedance of the wires or films.

In a further alternative the nuclei used for measuring recoil are the nuclei of a heavy element based semiconductor detector and recoil of these nuclei is measured by detecting the ionisation resulting from perturbation created by the recoil.

As mentioned above the present invention also extends to apparatus for detecting neutrinos. In one particularly preferred embodiment the apparatus comprises a plurality of superconducting metal elements, at least one dimension of which is small, means for cooling said superconducting elements to a temperature at which they are superconducting, means for impressing a magnetic field on said superconducting elements, means for detecting the change of state of said superconducting elements, and means for discriminating between the change of state of just one of said elements and the change of state of a plurality of said elements, at least within a specified volume of said elements, and for accepting the neutrino count only when a single element has changed state.

In this arrangement the superconducting elements are preferably formed of materials with higher atomic weights. This arrangement is based on the recognition that although the recoil energy of a heavy nucleus is inversely proportional to its atomic weight the scattering cross-section for neutrinos increases as the square of the neutron number so that the efficiency of detection in fact increases substantially with atomic weight.

By way of further explanation the average recoil energy of a nucleus is given by $$E_Z = 0.66 \times E\nu^2/A \text{ in Kev}.$$

whereby $E_{64}$ is the energy of the neutrino in MeV and A is the atomic number.

The cross-section for 1 kg of detecting material is given by $$\sigma \approx 1.8 \times 10^{-18} E\nu^2 N^2/A \text{ cm}^2$$

where N is the neutron number.

The heavy metal is preferably an element of high purity. In this connection the term "high purity" should be taken to mean at least 99.9 % pure and preferably better than 99.99 %. High purity is desirable because it means that the radioactive isotopes frequently found in metals will only be present in such small proportions that radiation within the superconducting metal elements themselves does not give rise to undue background noise.

The heavy metal can conveniently be an alloy of high purity elements where the term "high purity" again has the above meaning.

In a particularly preferred embodiment the superconducting metal elements are present in the form of individual grains of superconducting metal disposed in a carrier matrix.

The individual grains should be very small, preferably less than 10 microns and in particular of about 1 micron diameter.

Because the grains are very small only a very small amount of energy needs to be transferred into an individual grain to flip it out of the superconducting state. Thus even weakly scattered neutrinos stand a good change of being detected.

In an especially preferred embodiment the superconducting metal elements each comprise a thin sheath of superconducting metal on a core of magnetisable material such as ferrite. The superconducting elements need not be in the form of grains they can also take the form of thin films, or wires. In this case the cores, if provided, are also formed as thin films or wires.

It is important that at least one dimension of the superconducting metal elements is small. When a single nucleus is struck by a neutrino, and the material heated into the nonsuperconducting state, the magnetic field is able to pass through the position occupied by the heated area to the magnetisable core thus magnetising the core and producing a local field strength above the critical field strength. This high local field strength rapidly results in the whole superconducting metal element transferring into the non-superconducting state thus improving the magnetic signature of the event. If the superconducting elements are present in the form of, thin films or wires this change of state will result in a change in resistivity or impedance of the films or wires which can then be monitored to detect the change of state.

In an especially preferred embodiment the means for cooling the superconducting elements and the means for impressing a magnetic field on the superconducting elements are arranged to maintain the superconducting elements in the non-superheated superconducting state and means is provided for determining the time interval between the change of state occurring in one of said superconducting elements and the time required for it to return to its original state, and for comparing this time with a known time range characteristic of the range of neutrino energies of interest. This is the physical embodiment of the "flip-flopping" technique for recognising the characteristic signature of a neutrino mentioned earlier in this specification.

The superconducting elements are preferably considered as a plurality of volumes each of which constitutes, or is associated with, a separate evaluation channel. This means that radiation, other than neutrino radiation, entering the detector or originating from natural radioactivity in the detector will cause a change of state of a plurality of superconducting elements in one of the volumes and can readily be identified and rejected as background radiation.

A particularly preferred embodiment comprises at least one relatively massive superconducting body in each volume, means for detecting a change of state of said superconducting body as a measure of temperature instability in the associated volume and means for inhibiting recognition of signals from the associated volume during and after said period of temperature instability.

This embodiment is used with superconducting elements in the form of fine grains and allows noise due to temperature instabilities to be overcome. The superconducting bodies and elements are preferably present in the form of grains with the bodies being at least ten times larger than the elements. In a particularly preferred arrangement the superconducting bodies are made of a material having a change of state temperature threshold slightly lower than that of said superconducting elements. This means that temperature instability is sensed before it can give rise to spurious signals.

In order to detect the change of state of said superconducting elements and/or bodies a preferred embodiment of the invention envisages a plurality of pick-up loops disposed between the semiconductor elements, and means for detecting e.m.f.'s introduced in the pick-up loops as a result of the magnetic field being perturbed by a change of state of one of the superconducting elements. The pick-up loops can conveniently take the form of wires in the carrier matrix and can be formed by thin film techniques.

This arrangement has the advantage that known electronic equipment can be used to evaluate the results.

In one variant means are provided for comparing the size of the e.m.f.'s with a range of values corresponding to the expected energies deposed by the neutrinos, and for accepting the count only when a measured e.m.f. falls within the expected range (pulse height analysis).

Said means for discriminating between the change of state of just one of said elements and the change of state of a plurality of said elements, at least within a specified volume of said elements, can conveniently take the form of a coincidence or delayed coincidence circuit.

In a further variant the matrix containing the superconducting elements is made optically transparent and the means for detecting a change of state of the superconducting elements comprises means for directing a beam of polarised light through the matrix and means for detecting a change of polarisation in said beam of light due to a perturbation of the magnetic field associated with the change of state of a superconducting element. With an arrangement of this kind further means can usefully be provided for forming a holographic image of the matrix and superconducting elements.

In order to protect against radioactive contamination it is sensible for the superconductor material to be selected from metals which do not have long-lived radioactive isotopes.

The superconducting metal elements can take the form of thin films produced by vapour deposition onto a substrate. This embodiment has the advantage that large numbers of superconducting metal elements can be rapidly and accurately manufactured. This is particularly important if one bears in mind that the total weight of the superconducting elements required in one detector may be many kilogrammes.

The apparatus is preferably cooled by placing the detector in a multi-shelled cryostat. It will be apparent from the foregoing that a considerable number of signals representative of the change of state of the individual superconducting elements will need to be processed and this can conveniently take place, if the signals are in electrical form or are converted into electrical form, and are passed to a computer for processing.

An alternative arrangement for detecting neutrinos in accordance with the teaching of the present invention comprises a semiconductor detector, electrical means for detecting signals from said semiconductor detector due to incident radiation and means for discriminating between signals due to the recoil of a single nucleus in the semiconductor detector within an energy range corresponding to the expected energies of the incident neutrinos, and other signals.

Finally is should be pointed out that both with the superconducting and semiconducting detectors noise due to background ground radiation can be reduced by either passive and/or active shielding. The passive shielding can of course be any one of the well known types of passive shielding, e.g. lead, stainless steel, water or concrete which will have a marked effect on background radiation of all kinds but not on the neutrino flux which is substantially unaffected thereby. Active shielding can also be used, in particular the type of anticoincidence shielding discussed in relation to many of the embodiments given above.

The present invention also extends to new uses of a neutrino detector made possible by the improvements achievable by the above methods and apparatus. In one arrangement a neutrino detector, either operating in accordance with the method of the invention or constructed in accordance with one of the above proposed pieces of apparatus, is used for monitoring a nuclear reactor, which can be a fission reactor including a fast breeder reactor or a fusion reactor.

The detector is placed outside the reactor confinement but preferably within 100 m of the reactor core. The use of a neutrino detector for monitoring a nuclear reactor offers a significant improvement in monitoring the safety and efficiency of reactor operation.

All prior art reactor monitors are in effect contained within the reactor core so that the danger exists, as happened at the Three Mile Island accident in USA, that all the detectors will become either inoperative or inaccessible due to the reactor accident. As the neutrino detector can be positioned outside of the reactor confinement it can continue to be used for monitoring reactor activity when all other reactor monitors have failed.

In a preferred embodiment the detector is divided into at least three modules placed around the reactor core.

In an especially preferred arrangement the total mass of detecting material is at least one hundred kilograms and the measured flux of the neutrinos is used for dynamic analysis reactor performance. Thus, with an appropriately large detector the number of neutrinos detected in unit time can be sufficiently large to enable changes in the reactors performance to be monitored.

In a particularly preferred embodiment the total mass of detecting material is larger than 1000 kgs and the detector is divided into several modules for tomographic reconstruction of the location of fission products in the reactor core. The efficiency of the tomographic process can be improved by a small degree of movement of the individual modules. Alternatively, a single detector can be arranged for movement around the reactor core for tomographic reconstruction of the location of fission products inside the reactor core.

The neutrino detector can be used for searching for major leaks from fuel elements into the moderator/coolant matrix, and can also be used for monitoring a reactor following an accident.

In a further development the neutrino detector is used for assessment of changes in the elemental/isotopic composition of fissionable material inside the fuel rods.

This embodiment is based on the recognition that, with an appropriate quantity of the detector, a sufficient number of neutrinos can be detected to allow them to be split into various energy ranges. This can conveniently be done with reference to the time taken for each superconductor element to flip from the superconducting to the non-superconducting state and to flop back again. This time is directly proportional to the amount of energy deposed in the superconductor element (grain) and this is related to the energy of the neutrino scattered. As a characteristic neutrino energy spectrum exists for each of the nuclear species in the reactor, the energy spectrum of the measured flux of neutrinos can be used as a guide to the relative proportions of the different materials. In this way the reactor can be run more efficiently so that energy production, or the production of a particular type of fuel in a breeder reactor, can be optimised.

The neutrino detectors of the present invention can also be used for studying the geological structure of the earth through the neutrino signature of radioactive elements. The neutrino detector can in particular be used for detecting raw material deposits in the earth. The neutrino detector is particularly suitable for detecting deposits of one or more of the naturally radioactive elements, in particular K 40, U 238, U 235 and thorium.

Certain raw material resources are often found in association with one or more of these radioactive elements so that the presence of these radioactive elements can also act as a guide to the presence of other raw materials.

These uses of the detector recognise that local deposits of radioactive elements will give rise to a characteristic neutrino signature which can be detected by a suitably powerful detector.

A neutrino detector can also be used, again in accordance with the present invention, to detect deposits of materials with lower than average neutrino activity, in particular oil, gas and certain coal deposits. Hydrocarbon deposits generally contain only very low proportions of naturally radioactive material and are therefore very low sources of neutrinos. As the level of neutrino activity to be expected from such deposits lies below the average level of neutrino activity the very absence of neutrinos can be usefully exploited for oil prospecting. One particular advantage of the use of a neutrino detector for geological surveys is that fixed equipment and the drilling of expensive test bore holes, possibly to great depths in hard rocks, is simply not required. An initial localisation of deposits, and in particular big deposits which are worthy of exploitation is possible simply by moving a neutrino detector over the surface of the earth. In a particularly preferred arrangement the neutrino detector is mounted, towed or suspended for geological prospecting beneath the oceans, seas or lakes. This arrangement is particularly beneficial because water provides an excellent shield against other forms of background radiation. This technique can considerably reduce the cost of off-shore oil prospecting.

The neutrino detector can also be used above ground for prospecting purposes in which case it is preferably appropriately shielded and transported by a movable vehicle.

The neutrino detector can also be used for finding additional deposits of raw materials in existing mines by recognition of the neutrino signature of these deposits. In this case the neutrino detector is arranged for movement in mine shafts and tunnels.

Figure 2A:
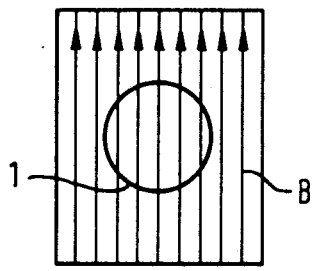
Figure 3:
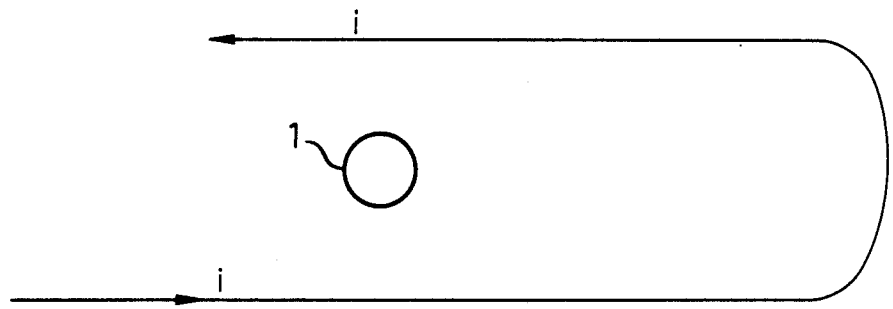
Figure 4:
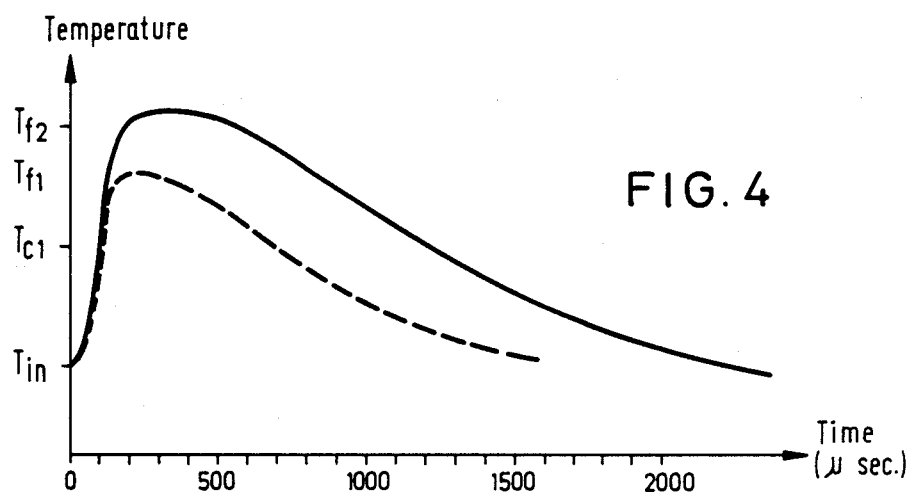
Figure 5:
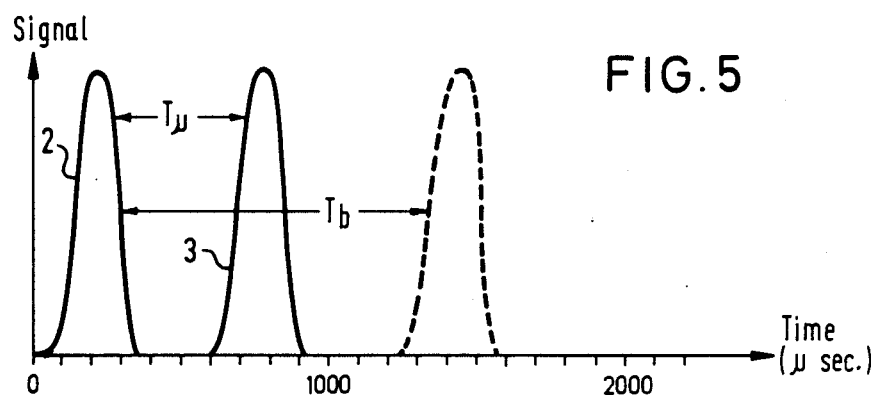
Figure 6:
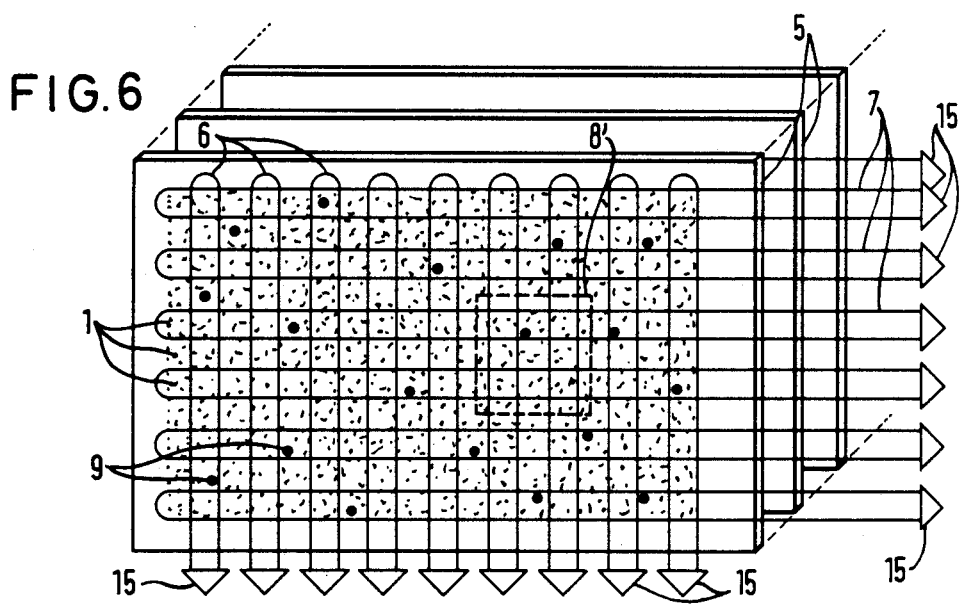
Figure 7:
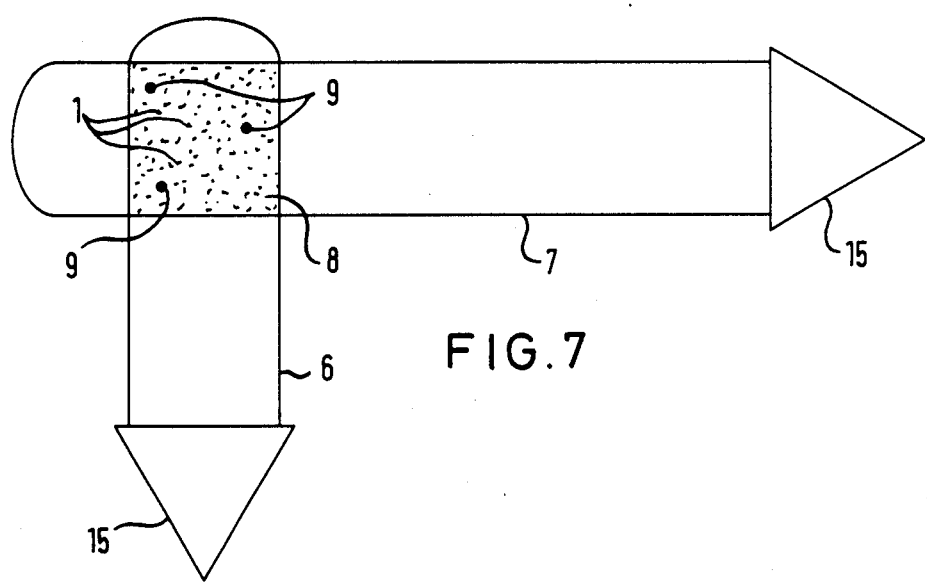
Figure 8:
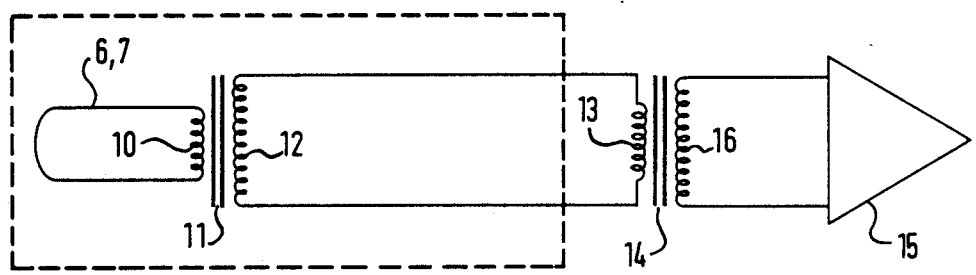
Figure 9:
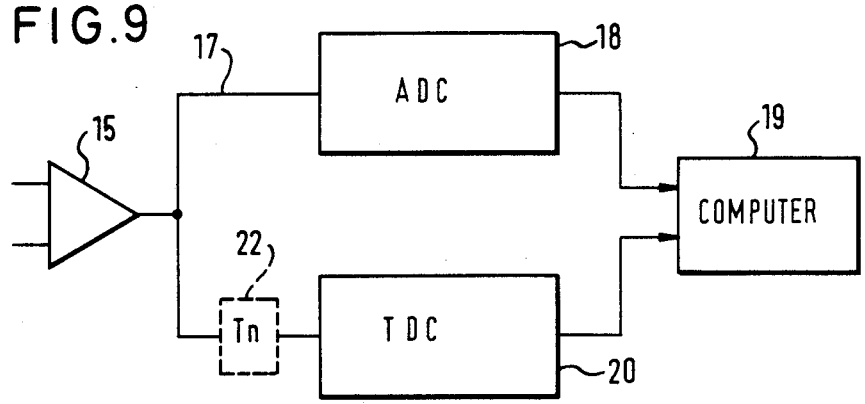
Figure 10:
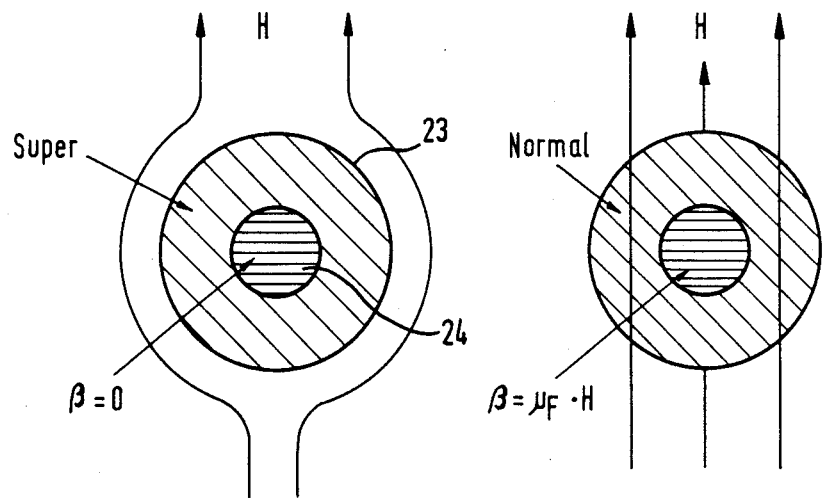
Figure 11:
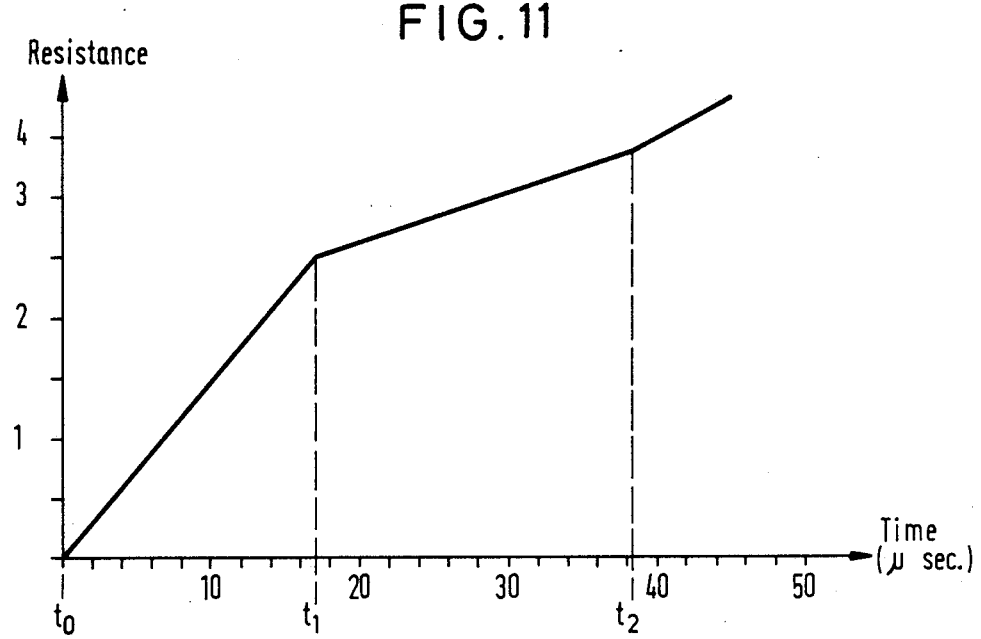
Figure 12:
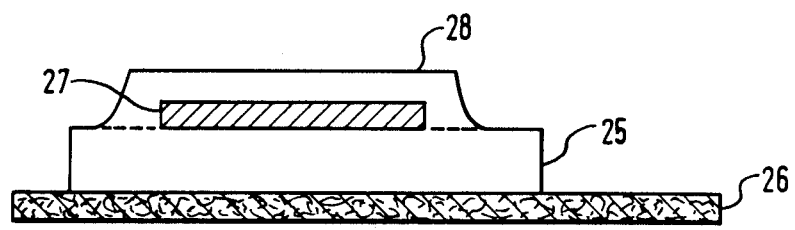
Figure 13:
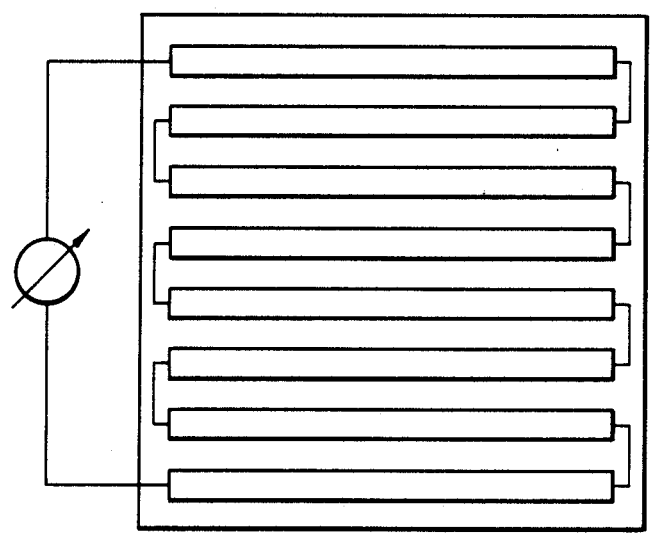
Figure 14:
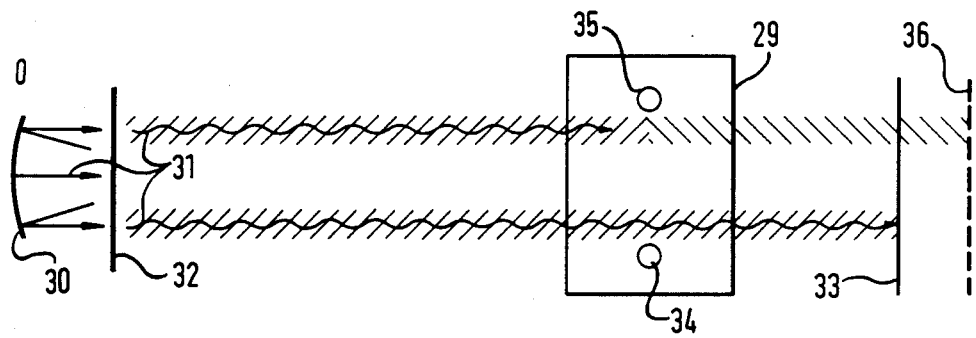
Figure 15:
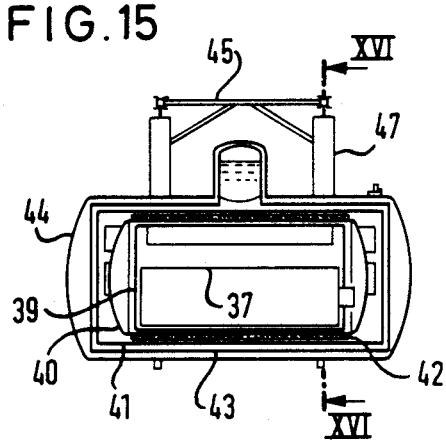
Figure 16:
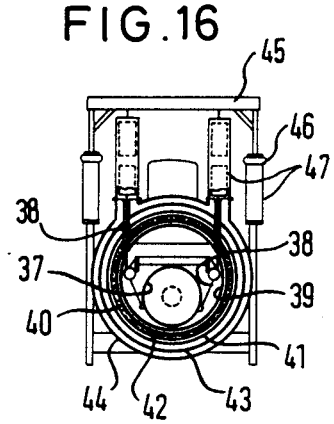
Figure 17:
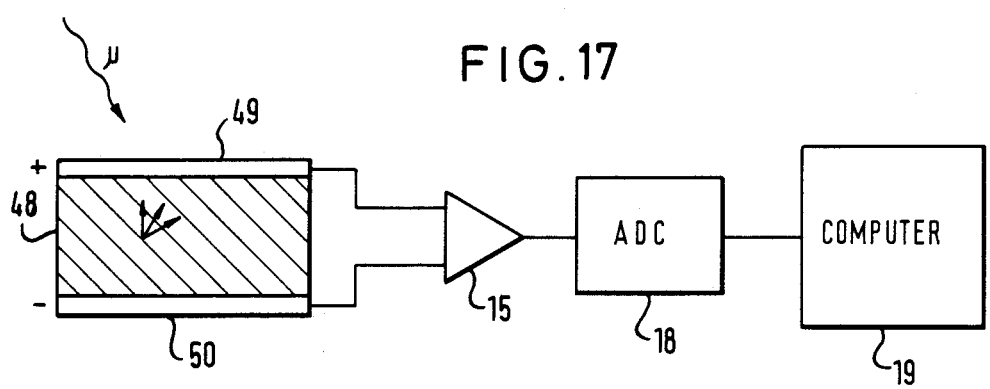
Figure 18:
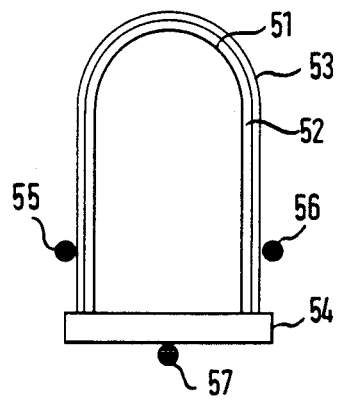
Figure 19:
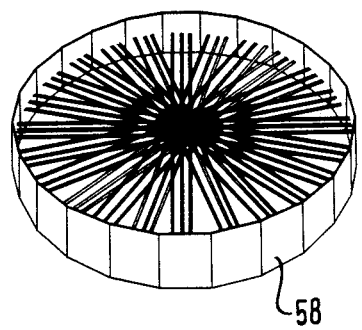
Figure 20:
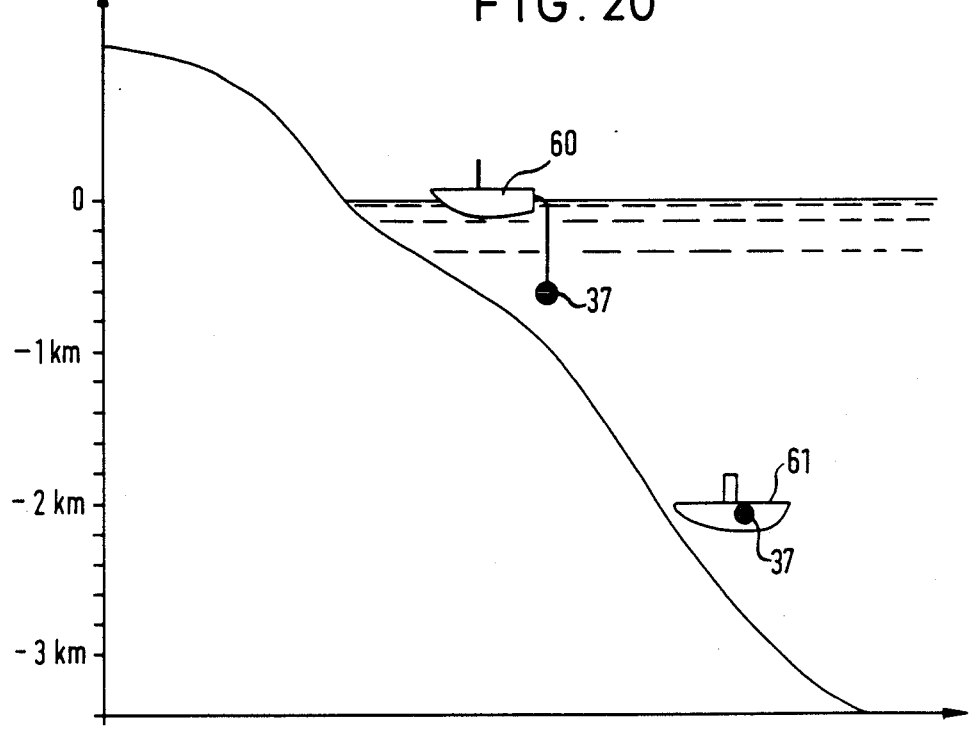

The invention will now be explained in more detail, by way of example only, with reference to the accompanying drawings in which FIG. 1 is a graph of magnetic field against critical temperature for a superconducting material, FIGS. 2a are diagrams illustrating the Meissner effect, and 2b FIG. 3 is a diagram illustrating how the Meissner effect can be used to produce a read-out signal, FIG. 4 is a graph showing the change in temperature of a superconducting element as a function of time, FIG. 5 is a graph showing signals derived from a super
conducting element behaving in accordance with the graph of FIG. 4, FIG. 6 is a schematic illustration of a superconducting detector, FIG. 7 is an illustration of a detail of FIG. 6, FIG. 8 is a detailed illustration of an electronic read out circuit suitable for use with the apparatus of FIG. 6, FIG. 9 illustrates the processing of signals from the electronic read-out circuit, FIG. 10 illustrates cross-sections through an alternative type of superconducting elements, FIG. 11 is a graph showing the change of resistivity of a superconducting element of the type shown in FIG. 10, FIG. 12 is a cross-section through an alternative type of superconducting element based on thin films, FIG. 13 shows a plan view of a superconducting element based on thin films, FIG. 14 shows a magneto-optic read-out technique suitable for use with a superconducting detector of the kind illustrated in FIG. 6, FIG. 15 illustrates a partly sectioned view of a cryostat containing a neutrino detector, FIG. 16 is a section on the line XVI—XVI of FIG. 15, FIG. 17 is a block diagram of an alternative neutrino detector, FIG. 18 illustrates the use of a neutrino detector for monitoring a nuclear reactor, FIG. 19 illustrates the possibility of monitoring a reactor by tomographic techniques, and FIG. 20 is an illustration of the use of a neutrino detector for geological prospecting.

Turning now to FIG. 1 there can be seen a graph of magnetic field H versus temperature showing the characteristic curve $Hc_c$ for one type of superconducting material. Beneath the curve $Hc_c$ the material is in the "non-superheated" superconducting state.

Reference numeral 1 illustrates a grain of superconducting material which is located within the superconducting region. If a small amount of energy is transferred to this grain 1 it will heat up by an amount $\Delta T$ and flip from the superconducting region into the normal region. On cooling down to its original temperature the grain is able to pass or "flop" back into the non-superheated superconducting state and will do so automatically.

In a second kind of superconducting material a so-called superheated region exists between the normal and the superconducting regions. The superconducting material remains superconducting in this superheated region although it is above the transition temperature. Superconductors operating in the superheated region have been used in the prior art for detectors for the detection of charged particles, neutrons and photons. However such detectors are unsuitable for neutrino detectors for many reasons particularly those concerned with background/noise. The detectors described in this application are particularly directed to superconductors which are not in the superheated state.

FIG. 1 also illustrates another important concept of the present invention. The grain at 1 is maintained in the state illustrated in FIG. 1 by maintaining the temperature of the detector at $T_{in}$ and placing it in a magnetic field of strength $H_1$.

In this state a certain amount of energy $\Delta E_i$, is required to raise the temperature of the particle sufficiently for it to change state. However, if the magnetic field strength is reduced to $H_2$, then an increased amount of energy $\Delta E_2$ is required to cause the particle to change state. Thus the superconducting characteristic is such that it can be exploited to set a variable energy threshold for the minimum amount of energy which must be deposed in a superconducting grain for a change of state to occur. Clearly incident radiation and in particular neutrinos must have energies above this minimum threshold if a change of state is to occur. In other words the invention can be used for energy discrimination.

Figure 2B:
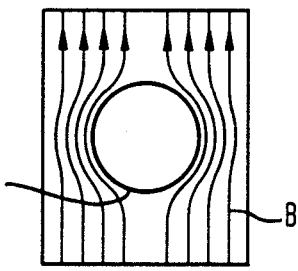

Turning now to FIGS. 2a and 2b there is shown an illustration of the so-called "Meissner" effect. FIG. 2a shows a superconducting element 1 in the non-superconducting state located in a parallel magnetic field B. It will be seen that the field lines pass through the body of the superconducting material. If the superconducting element is now converted into the superconducting state, for example by lowering its temperature sufficiently, the magnetic field B will suddenly be expelled from the superconducting element and the field lines will adopt the shape illustrated in FIG. 2b.

Clearly this change in the magnetic field can be detected by a suitable detector and one possible arrangement is shown in FIG. 3. In FIG. 3 the grain 1 is located inside a wire pick-up loop and it will be appreciated that the change in the magnetic field will induce an e.m.f. into the wire loop which can readily be detected with suitable amplification techniques.

Turning now to FIG. 4 there can be seen a graph illustrating the change of temperature of a superconducting grain normally maintained at the initial temperature $T_{in}$ in the superconducting state illustrated in FIG. 1. If a neutrino strikes one of the nuclei within this superconducting element or grain at the time t=O the neutrino will be scattered and the nucleus will recoil. This is equivalent to an energy input into the superconducting element and its temperature will rise to a maximum $T_{f1}$ in accordance with the broken line. The height of this maximum lies above the critical temperature $T_{cl}$ appropriate to the particular type of superconducting material and the impressed magnetic field. In other words the superconducting element changes from the non-superheated superconducting state to the normal conducting state. As it passes through the critical temperature $T_{cl}$ the magnetic field previously expelled from the superconducting element will reenter the element and will generate a signal 2 as illustrated in FIG. 5.

The material surrounding the superconducting element continues to be at the temperature $T_{in}$ and thus the superconducting element will cool in accordance with the dotted line until after a period of, in this case, some 800 nano-seconds it once again reaches the critical temperature $T_{cl}$. At this point the magnetic field will once again be expelled from the superconducting element or grain and a second signal 3 will be generated. In the superconducting state the specific heat of the superconducting material again reduces to a very low value and the grain cools down to the initial temperature $T_{in}$.

The graph of FIG. 4 and the signal plot of FIG. 5 also show the equivalent situation if the superconducting element is struck at t=O by a charged particle or absorbs some other form of radiation energy which also results in an increase in its temperature. As, with other forms of radiation, the amount of energy transferred is likely to be much greater the superconducting element or grain will be heated to a temperature $T_{f2}$ as shown by the solid line. Because this temperature is higher it will take longer for the superconducting element or grain to cool down and it will reach the critical temperature $T_{cl}$ after a longer time interval $T_b$, for example 1400 nanoseconds, and will thus generate a signal 4 which occurs considerably after the signal 3.

Clearly the time interval $T\nu$ between the signals 2 and 3, which represents the flip-flopping time for the superconducting element or grain following the scattering of a neutrino, will not be a fixed value but will lie within certain limits depending on the energy of the incident neutrino, the angle at which it is scattered and variations in the size of the superconducting element or grain at which scattering occurs. However, this range of times will in general be considerably less than the time required for flip-flopping of a grain which is heated by background radiation. It is thus possible, by timing the interval between two signals generated in, for example, the pick-up loop of FIG. 3, to distinguish neutrinos from background radiation with a high probability. Furthermore, it is possible to relate the measured time interval $T\nu$ statistically to the neutrino energy and thus provide good energy resolution.

A superconducting neutrino detector based on the above principles is illustrated in FIG. 6.

In this embodiment the neutrino detector takes the form of a very large number of superconducting elements, in this case tiny grains 1 with diameters of a few microns which are distributed through a dielectric substrate.

This dielectric substrate can, for example, take the form of a long strip of film material on which the grains are deposited. The strip is then wound into a roll to form a cylindrical detector. Alternatively lengths of film material can be stacked together to form a three dimensional detector as in fact illustrated in FIG. 6.

FIG. 6 also shows a number of wire pick-up loops 6 and 7 extending through the dielectric matrix. The pick-up loops 6 extend parallel to one another in the Y direction and the pick-up loops 7 extend parallel to one another in the X direction. Thus the crossed arrangement of the pickup loops enables not only change of state of the grains to be detected but also gives basic information as to the X and Y coordinates of a grain which has changed state within the matrix. Information on the third Z dimension is obtained by reference to the layer of material in which the activated X and Y pick-up loops lie. The pick-up loops in the successive layers of the detector have been largely omitted for the sake of clarity.

The regions where the X and Y read-out loops cross one another define a series of small volumes of the detector one of which 8 is shown to an enlarged scale in FIG. 7. The depth of this volume is the thickness of one layer of film. As can be seen from FIG. 6 and more clearly from FIG. 7 there are a number of larger superconducting grains 9 distributed throughout the matrix with at least one of the larger superconducting grains being present in each of the volumes 8. In the volume illustrated in FIG. 7 three such large superconducting grains are present. These large superconducting grains are used in a manner which will be explained later for temperature sensing purposes.

If a neutrino enters the volume 8 of FIG. 7, and is scattered on a nucleus present in one of the many small superconducting grains, that nucleus will recoil and the grain will heat up and cool down in the manner explained above with reference to FIGS. 4 and 5, thus generating the signals 2 and 3. The probability of the same neutrino striking further nuclei, or of another neutrino striking another nucleus at the same time, is infinitesimally small.

If another energetic particle for example a proton, electron, photon or neutron enters the detector the probability is very high that it or its reaction products will strike more than one grain. In other words several grains will change state and indeed will be heated to a higher temperature than a grain struck by a neutrino.

The aforementioned incident particle will therefore in general give rise to a large number of signals in the detector loops and can thus be readily distinguished from an incident neutrino which generates only one signal. If a plurality of grains flip in one loop only, this event can be readily distinguished from a single grain flipping by pulse height analysis. Should background radiation cause a change of state of only one grain it will still be possible to distinguish this background radiation from a neutrino because the probability is very high that the energy transferred by the background radiation to an individual grain will be much greater than in the case of a scattered neutrino, with the result that the time delay Tb between the signals 2 and 4 will be very much longer than the characteristic time for a neutrino, so that the background radiation can also be distinguished from its time signature.

It is not necessary for the volume 8 to be defined by just two detector loops as shown in FIG. 7, a characteristic volume can indeed include several X and Y detector loops in order to improve sensitivity, such as the volume 8′ in FIG. 6. In any event each volume should contain at least one and preferably several of the larger superconductor bodies which provide information on temperature instability in the volume and allow this source of error to be excluded from the detector output. The characteristic volumes 8, 8′ can either be fixed within the volume of the detector, e.g. by grouping detector loops together into distinct evaluation channels, or they can be defined around an event by appropriate software. As previously mentioned the superconductor bodies 9 are considerably larger, preferably by a factor of at least 10, than the superconducting grains 1. If a temperature instability occurs and one of the larger grains changes state it will produce a much bigger disturbance of the applied magnetic field and will induce a much larger e.m.f. in the associated read-out loops. Thus the amplitude of the e.m.f.'s induced. in the read-out loops makes it possible to distinguish between a change of state of a large superconducting body and one of the much smaller superconducting elements or grains. The simple size of the superconducting bodies is such that it will hardly be possible for a change of state to occur as a result of the scattering of neutrino or background radiation. As the bodies are much more massive they will also take a longer time to cool down so that the spacing of the signals from the superconducting bodies also provides a further indication of temperature instability.

The arrangement can be made more sensitive to temperature instabilities if the large superconducting bodies, the temperature guage grains, are made of a different superconducting material than the superconducting elements, and indeed of a material which has a slightly lower critical threshold between the superconducting and normal states. This lower threshold can be produced by suitable alloying.

In this way the temperature guage grains will flip before a temperature is reached which produces actual instability of the superconducting elements. It will be appreciated that the total mass of the superconducting elements or grains is much larger than that of the superconducting bodies.

Clearly signals showing temperature instability of one of the characteristic volumes can be used to inhibit the recognition of signals from those volumes for the duration of the temperature instability and for an interval thereafter.

The actual read-out of signals from the individual detectors and their processing in a central computer is illustrated in FIG. 8 and 9.

In FIG. 8 a typical pick-up loop 6, 7 is terminated by a primary winding 10 of a transformer 11 which is also maintained at a low temperature. The secondary winding 12 of this transformer is connected to the primary winding 13 of a second transformer 14 held at rom temperature or in liquid nitrogen. A low noise pre-amplifier 15 is connected to the secondary winding 16 of the second transformer 14 and is maintained at the same temperature. Alternatively the second amplifier is not used and the pre-amplifier is connected to the first transformer and maintained in liquid helium.

One pre-amplifier 15 is typically provided for each pickup loop and each pre-amplifier is connected to a respective signal evaluation circuit.

In the circuit of FIG. 9 the signals from the pre-amplifier 15 are passed in a first branch 17 to an analog to digital converter 18 which in turn passes the digitised signals to a computer 19 for pulse height analysis and subsequent evaluation. In a second branch 20 the signals are passed to a time to digital converter 21 where the flip-flopping time is measured and digitised. The resulting information is also passed to the computer 19 for analysis. Alternatively the signals from the pre-amplifiers may be modified by suitable pulse shaping amplifiers before being fed to the circuit of FIG. 9.

Furthermore an appropriate threshold device 22 can be used to trigger the time to digital converter 20. The information coming from the individual channels and or external anti- c coincidence converters can be analysed by the computer using a coincidence/anti-coincidence program.

It is also possible to look for coincidence in different channels by using appropriate hardware.

The change of state of the superconducting elements can also be detected in other ways. One alternative is illustrated in FIG. 10. In the embodiment of FIG. 10 the superconducting elements take the form of a very thin sleeve of superconducting material 23 arranged around an elongate ferrite core 24. The individual superconducting elements can thus be visualised as wires running in the X and/or Y directions through a suitable dielectric matrix.

It is emphasised that both the superconducting element and the ferrite core are very thin in the radial direction. In the superconducting condition shown to the left hand side of FIG. 10 the magnetic field H is expelled from the superconducting element and the magnetic flux B in the ferrite core is zero. If now a neutrino strikes a nucleus in the sheath of the superconducting element, or in the core, that nucleus will recoil and will heat up in the manner previously described so that the magnetic field H will locally have access to the ferrite core. The ferrite core will become magnetised in accordance with the equation $B = \mu_F H$ and the higher field strength in the ferrite core will lie above the critical level Hc so that the superconducting element will rapidly convert into the normal conducting state, and the resistivity of the superconducting element will change as illustrated in FIG. 11. The normal state will propagate at essentially constant speed along the wire in both directions and will generally reach one end of the wire first. Thereafter it will continue to propagate to the second end and this accounts for the kink in the graph. The propagation of the normal state will result in a time dependent change of the resistivity and of the impedance of the element which will allow the position of the event along the wire to be determined.

The measurement of the resistivity and/or impedance can be done in several ways e.g. incorporating the superconductor element as the resistor of an RC circuit and measuring the frequency of the resulting RC oscillations. Clearly an LC oscillator could also be used. Furthermore a pulse can be injected into the superconducting element and the pulse propagation delay time measured.

One convenient way of realising the arrangement of FIG. 10 is the use of thin film techniques as shown in FIGS. 12 and 13.

In this arrangement a thin layer 25 of the superconducting material is first deposited on a dielectric substrate 26 by vapour deposition. A thin strip 27 of ferrite material is then applied and the whole is then encased with a further thin layer 28 of superconductor. The resulting detector element is shown in plan view in FIG. 13. It will be appreciated that the whole detector consists of a very large number of such thin films stacked one on top of the other and side by side.

A further alternative read-out arrangement is illustrated in FIG. 14. In this arrangement the detector again takes the form of a large number of minute superconducting grains held in a dielectric matrix. The matrix 29 is transparent and optically active and this enables a so-called magnetooptic read-out. For this arrangement a light beam scanning arrangement 30 directs light beams 31 through a first polariser 32 which results in the presence of plane polarised light. This plane polarised light passes through the matrix 29 and then falls on a second polariser 33 which is used as an analyser and which is crossed at 90° to the first polariser 32. For the purpose of illustration just two grains 34 and 35 are shown in the colloidal matrix. Grain 34 is shown in its normal superconducting state and in this state it does not perturb the magnetic field so that the polarisation of the incident light is unaffected and this light is stopped by the crossed polariser 33. Grain 35 has however just been struck by a neutrino and has changed state with a resulting perturbation of the magnetic field. This perturbation of the magnetic field rotates the plane of polarisation of the beam of light 31 and a fraction of this beam of light then passes through the crossed polariser 33 to fall on a light sensitive detector 36.

Instead of using beam scanning techniques one can also use a holographic approach. In this case a coherent light source is used to illuminate the whole surface of the detector and a reference beam derived from the same light source is used to produce an interference image with the light passing through the detector and the polarisers.

As previously mentioned all the above described detectors must be kept in a cryostat to keep the temperature low enough for superconducting operation. A suitable cryostat arrangement is illustrated in FIGS. 15 and 16.

As seen in FIGS. 15 and 16 the actual detector 37 takes the form of a cylinder which is suspended on supports 38 within an inner shell 39. The temperature inside the inner shell 39 is held; using known techniques, at less than 2° Kelvin and preferably less then 1° Kelvin. This inner shell 39 is in turn spaced from a first intermediate shell 40 which is maintained at around 2° Kelvin by pumped liquid helium. The first intermediate shell 40 lies within and is spaced from a second intermediate shell 41 which is held at a temperature of approximately 30° K. by helium gas. An annular coil 42 is located between the first and second intermediate shells 40 and 41 and extends over the whole length of the detector. A current is passed through this annular coil and this generates an axially directed magnetic field within the annular coil which permeates the detector and provides the magnetic field H required for the detector. The second intermediate shell 41 is in turn disposed within and spaced from a third intermediate shell 43 which is maintained at 77°. K. by liquid nitrogen. Finally this third intermediate shell lies within and is spaced from an outer shell 44 which is at ambient temperature. Normal thermal insulation is provided between the second and third intermediate shells and between the third intermediate shell and the outer shell. The concentric shells are supported by a stand 45 via air mounts 46 and acoustic filters 47.

The majority of the electronic signal amplifying circuitry is provided between the inner shell and the first intermediate shell adjacent one end of the detector. The positioning of the electronic circuitry in this cold environment ensures that thermal noise is largely eliminated.

An alternative detector in the form of a semiconductor detector is shown in FIG. 17. The detector comprises either a single large semiconductor crystal 48 or a plurality of such crystals. Metal contacts 49 and 50 made e.g. by vapour deposition are maintained at a potential difference V. A neutrino scattered at the inside of the semiconductor material will cause a nucleus to recoil and will generate a small amount of free carriers which drift through the semiconductor to the metal contacts and generate a voltage pulse which is amplified by the pre-amplifier 15. A very fast analogue to digital converter 18 digitises the pulse and passes the digitised information to a computer 19. If background radiation strikes the detector the pulse will be generally much higher (more energy deposed) and also wider and can be distinguished from its different signature.

There are many possible uses of the improved neutrino detector. One possible use for monitoring nuclear reactors is illustrated in FIG. 18.

FIG. 18 illustrates the reactor containment shield which consists of an internal hemispherically domed welded steel plate structure 51 an air space 52 surrounding the welded steel plate structure 51 and an external reinforced concrete shell 53. The welded steel plate structure 51 and the outer reinforced concrete shell 53 are anchored to a base or liner 54. In a typical arrangement the welded steel plate structure would have a radius of about 20 m. The neutrino detector 37 should be positions as close as possible to the reactor outside the reactor containment. Three possible positions are indicated at 55, 56 and 57 in FIG. 18.

The total flux of neutrinos emerging from the reactor is an accurate measure of the nuclear activity within the reactor. Thus the neutrino detector is able to provide high quality information about the state of activity within the reactor. This is particularly important because the neutrino detector is located outside of the containment shield rather than inside the reactor core as is the case with all other important reactor monitoring devices.

Thus, even if the reactor begins to go out of control, with consequent damage to the existing monitors within the reactor the neutrino detector located outside of the containment shield is still in a position to provide good quality information on the state of activity within the reactor and to enable the necessary control measures to be taken.

With a large detector the detected neutrino flux can be sufficiently large that the neutrino detector can be used for on-line control purposes. By way of example the statistical energy distributions of neutrinos originating from different fission processes, for example the fission of plutonium 239 or uranium 235, differ so that statistical analysis of the energies of the detected neutrinos (possibly using the flip flop and/or energy threshold techniques disclosed in the present application) enables an assessment to be made of the relative amounts of uranium 235 and plutonium 239 within the reactor. This information is important for two reasons, firstly it enables the fuel rods to be exchanged for fresh ones at a desired point in the fission cycle and secondly it allows the reactor to be run nearer to the efficient maximum level of operation.

At present nuclear reactors are generally run at some 10% below the theoretical maximum efficiency point in order to avoid instability problems. The availability of a suitable neutrino detector improves the control information sufficiently to allow this margin to be significantly reduced with an attendant increase in the efficiency of reactor operation.

It is also possible, as illustrated in FIG. 19,-to monitor a reactor using tomographic techniques. FIG. 19 shows the set up for transaxial computer tomography wherein views are taken around 360°. Each of the facets 58 of the FIG. 19 arrangement represents one position of a neutrino detector around the axis of the containment shell of FIG. 18. The individual neutrino images can be formed either by subdividing the detector mass into a plurality of detectors, for example fifteen, or by moving one detector around the axis of the reactor. In the former case it is also advantageous if the individual modules are movable because this helps improve the resolution of the tomographic image. Using tomographic principles it is possible to investigate the neutrino activity of individual fuel rods and to check for the presence of leaky fuel rods. Naturally advanced mathematical techniques are required for evaluation purposes.

Another way of using the neutrino detector of the present invention is for geological prospecting. There are essentially four naturally occurring radioactive elements in the earth's crust namely K 40, Rb 87, U 235, U 238 and thorium. It will be appreciated that the neutrino activity at local positions of the earth's crust will be affected by the presence of local deposits of these radioactive materials, and that suitable detectors will enable them to be detected despite the presence of background neutrino radiation originating from the sun and elsewhere.

Rubidium 87 is relatively rare and therefore local increases in radioactivity are almost certainly due to the presence of either K 40 or uranium and thorium. Fortunately K 40 on the one hand and uranium and thorium on the other hand have very different geological histories and appear as deposits in different places. The energy spectra of the neutrinos from the individual sources are also rather different so that a detector with good energy resolution, such as is proposed in the present application, will also make it possible to identify the material responsible for the increased neutrino activity. One particularly favourable aspect of prospecting using a neutrino detector is that it is able to locate buried sources of radioactivity which would not be found by conventional radioactivity logs since other forms of radiation are stopped by a few metres of earth or water. The situation is even better if prospecting is carried out under water because the water then also provides excellent shielding against background cosmic radiation.

It is possible to prospect not only for the basic radioactive minerals but also for other raw material deposits which are found in association therewith. By way of example gold, silver, platinum and other noble or rare metals are frequently found in potassium-alunite deposits. The neutrino detector can also be used for prospecting for fossil fuels such as oil and gas. Fortunately oil and gas are very poor in potassium and heavy metals and their density is much smaller than that of typical rocks. This means that there will be a notable absence of neutrino activity in the vicinity of oil and gas fields and the neutrino detector can be used to look for a decrease in the normal level of background neutrino radiation thus allowing identification of oil and gas reserves. Geological prospecting using a neutrino detector should be considerably less expensive than using prior art techniques because there is no need to drill expensive test bore holes. The neutrino detector is also particularly well suited for under water geological exploration and indeed is particularly suited for operation under the sea. In this connection it should be pointed out that sea water is much less radioactive than rocks and that the earth's crust is thinner under the seas. This results in a better signal to background ratio and leads to an enhanced neutrino signature for the deposits of interest.

Two possible arrangements are shown in FIG. 20. In one arrangement the neutrino detector 37 is suspended on a long string from a surface ship 60 and is used to explore depths which, with present day knowledge, can range down to 1.5 to 3 km. In the alternative arrangement the neutrino detector 37 is mounted in a submarine 61 (but not a nuclear submarine). Both arrangements allow good geological mapping of the sea bed it only being necessary for the ship or submarine to move the detector at an appropriate speed across the area to be mapped. Information about the depth of a deposit of interest can be found by taking readings of different vertical levels.

Obviously the detector can also be carried by a land vehicle or by an air craft for geological studies of land masses.

One further possibility is the use of a neutrino detector for finding new deposits of materials in existing mines. For this purpose the neutrino detector should be mounted on a suitable vehicle, carriage or platform and moved up and down mine shafts or along subterranean tunnels until a change in the recorded level of neutrino activity is registered.

Finally it will be appreciated that underground or underwater storage areas for nuclear waste can be monitored by similar methods.

One possibility of realising the neutrino detector in terms of thin films is to use a large array of very many, so-called "Josephson junctions" which have previously been used as switches and for research purposes such as measuring the fundamental electric charge and generating high frequency radiation. A Josephson junction is basically a pair of superconducting elements separated by a thin insulating barrier which, if heated by recoil of a neutrino, would go into the normal state and change the state of the junction. Josephson junctions can be mass produced and include their own read-out lines, they could therefore be used in an array in an analogous manner to the detector of FIG. 6.

We claim:

1. Apparatus for detecting low and medium energy neutrinos the apparatus comprising a plurality of superconducting metal elements, at least one dimension of which is small, means for cooling said superconducting elements to a temperature at which they are superconducting, means for impressing a magnetic field on said superconducting elements, means for detecting the change of state of said superconducting elements due to the deposition of a minimum energy, $\Delta E$, where $\Delta E$ raises the temperature of said superconducting element sufficiently for it to change state, and means for discriminating between the change of state of just one of said elements and the change of state of a plurality of said elements, and for accepting the neutrino count only when a single element has changed state.

2. Apparatus in accordance with claim 1 wherein the superconducting elements are formed of a material having a high atomic number.

3. Apparatus in accordance with claim 1 wherein said metal is an element of high purity.

4. Apparatus in accordance with claim 1 wherein said metal is an alloy of high purity elements.

5. Apparatus in accordance with claim 1 wherein said superconducting metal elements are in the form of individual grains of superconducting metal disposed in a carrier matrix.

6. Apparatus in accordance with claim 5 wherein the individual grains are of substantially the same size and composition.

7. Apparatus in accordance with claim 1 wherein said superconducting metal elements each comprise a thin sheath of superconducting metal on a core of magnetisable material.

8. Apparatus in accordance with claim 7 wherein said core is elongate.

9. Apparatus in accordance with claim 8 wherein said superconducting metal and said elongate core are formed as thin films.

10. Apparatus in accordance with claim 8 wherein said elongate cores take the form of thin wires.

11. Apparatus in accordance with preceding claim 8 and wherein said means for detecting the change of state of said superconducting elements comprises means for detecting the change of resistivity thereof which occurs during a change of state.

12. Apparatus in accordance with preceding claim 1 wherein said means for cooling said superconducting elements and said means for impressing a magnetic field on said superconducting elements are arranged to maintain said superconducting elements in the non-metastable superconducting state, and wherein means is provided for determining the time interval between a change of state occurring in one of said superconducting elements and the time required for it to return to its original state, and for comparing this time with a known time range characteristic of the range of neutrino energies of interest.

13. Apparatus in accordance with preceding claim 1 wherein the superconducting elements are considered as a plurality of volumes and wherein each said volume constitutes or is associated with a separate evaluation channel.

14. Apparatus in accordance with claim 13 and further comprising at least one relatively massive superconducting body in each volume, means for detecting a change of state of said superconducting body as a measure of temperature instability in that volume, and means for inhibiting the recognition of signals from the associated volume during said period of temperature instability.

15. Apparatus in accordance with claim 14 wherein the superconducting metal elements are in the form of grains and the superconducting bodies are in the form of grains which are at least ten times larger.

16. Apparatus in accordance with claim 14 wherein said superconducting bodies are made of material having a change of state temperature threshold lower than that of said superconducting elements.

17. Apparatus in accordance with preceding claim 1 wherein said means for detecting the change of state of said superconducting elements and/or bodies comprises a plurality of pick-up loops disposed between said superconducting elements, and means for detecting e.m.f.'s induced in the pick-up loops as a result of said magnetic field being perturbed by a change of state of one of said superconducting elements.

18. Apparatus in accordance with claim 17 and wherein means are provided comparing the size of said e.m.f.'s with a range of values corresponding to the expected energies deposed by the neutrinos, and for accepting said count only when a measured e.m.f. falls within the expected range.

19. Apparatus in accordance with preceding claim 1 wherein said means for discriminating between the change of state of just one of said elements and the change of state of a plurality of said elements, at least within a specified volume of said elements, comprises a coincidence or delayed coincidence circuit.

20. Apparatus in accordance with preceding claim 8 wherein said matrix is optically transparent and wherein said means for detecting a change of state of said superconducting elements comprises means for directing a beam of polarised light through said matrix, and means for detecting a change of polarisation in said beam of light due to a perturbation of the magnetic field associated with a change of state of said superconducting element.

21. Apparatus in accordance with claim 20 wherein means is provided for forming a holographic image of the matrix and superconducting elements.

22. Apparatus in accordance with preceding claim 1 wherein said superconductor is selected from metals which do not have long-lived radioactive isotopes.

23. Apparatus in accordance with preceding claim 1 wherein said means for cooling said superconducting elements comprises a cryostat.

24. Apparatus in accordance with preceding claim 1 wherein signals representative of the change of state of the individual superconducting elements are in, or converted into, electrical form and are passed to a computer for processing.

25. A method of detecting low and medium energy neutrinos, the method comprising the steps of:
   providing a detector;
   selecting a detector comprising a plurality of volumes in the form of superconducting metal elements having said nuclei present therein;
   scattering neutrinos on nuclei contained in the detector;
   detecting the recoil of said neutrinos by measuring an associated signal generated by detecting the heating and subsequent change of state of one of the superconducting metal elements and representative of the perturbation of the quiescent state of the detector;
   analyzing the measured nuclear recoil signal to distinguish between the recoil of a single nucleus and other types of interaction involving recoil of a plurality of electrons and/or nuclei;
   accepting the signal as neutrino count only when a single nucleus has recoiled; and
   updating said neutrino count when a single nucleus in the associated volume has recoiled.

26. A method in accordance with claim 25 further comprising the steps of:

providing superconducting elements that are not in a superheated state;

detecting the time required for said superconducting metal element to change back to the superconducting state;

comparing this time with a characteristic time range; and accepting the neutrino count only when said time falls within said time range.

27. A method in accordance with claim 26 further comprising the step of:

providing superconducting metal elements, each having at least one dimension which is very small, and which are distributed in a plurality of volumes;

providing at least one relatively massive, super-conducting, metal body in each volume;

detecting changes of state of said relatively massive, super-conducting, metal bodies as a measure of local temperature instability in the associated volumes; and rejecting other signals originating from the associated volume during the period of temperature instability.

28. A method in accordance with claim 25 wherein said step of detecting the change of state of the superconducting metal elements comprises the steps of:

subjecting the metal elements to a magnetic field at the appropriate level; and electronically detecting the entry of the magnetic field into the superconducting elements on the change of state from superconducting to non-superconducting, and/or expulsion of the magnetic field from the superconducting elements on the change of state from non-superconducting to superconducting.

29. A method in accordance with claim 28 further comprising the step of:

selecting the magnetic field to determine energy threshold of the detector.

30. A method in accordance with claim 28 further comprising the step of:

measuring the energy deposed by measuring the time required for the superconducting metal element to change back to the superconducting state.

31. A method in accordance with claim 28 wherein said step of detecting the entry/expulsion of the magnetic field into/from the superconducting elements comprises the steps of:

providing a plurality of pick-up loops associated with said superconducting metal elements; and detecting the associated e.m.f. induced into an associated pick-up loop.

32. A method in accordance with claim 28 wherein said step of detecting the entry/expulsion of the magnetic field into/from the superconducting element comprises:

detecting the change of the state of polarization of a monitoring light beam directed through the detector.

33. A method in accordance with claim 28 further comprising the step of:

providing superconducting metal elements in the form of thin wires or films; and wherein the step of detecting the change of state comprises the step of:

monitoring the change of resistivity and/or impedance of the wires or films.

34. A method of detecting neutrinos comprising the steps of:

providing a detector;

scattering neutrinos on nuclei contained in the detector;

selecting said detector to comprise a plurality of superconducting metal elements having said nuclei present therein;

detecting the recoil of said nuclei by measuring the associated signal produced by detecting the heating and subsequent change of state of one of the superconducting metal elements;

analyzing the measured nuclear recoil signal to distinguish between the recoil of a single nucleus and other types of interactions involving recoil of a plurality of electrons and/or nuclei; and accepting the signal as a neutrino count only when a single nucleus has recoiled.

35. Apparatus for detecting low and medium energy neutrinos, the apparatus comprising:

a plurality of superconducting metal elements, at least one dimension of which is small;

means for maintaining said superconducting elements in the non-metastable superconducting state by cooling said superconducting elements to a predetermined temperature and impressing a magnetic field of predetermined magnitude on said superconducting elements;

means for discriminating between the change of state of just one of said elements from said non-metastable superconducting state to the normally conducting state and the change of state of a plurality of said elements from said non-metastable superconducting state to the normally conducting state;

means for accepting the neutrino count only when a single element has changed state;

means for determining the time interval between the change of state occurring in a given one of said superconducting elements and the time required for the given one of said superconducting elements to return to its original state wherein said time interval is related to the energy $\Delta E$ deposited by the associated neutrino in said element, which can only raise the temperature of said superconducting element sufficiently for it to change state if said associated neutrino has an energy above said minimum threshold energy; and means for comparing this time interval with a known range characteristic of the range of neutrino energies of interest.

* * * * *